US009986164B2

(12) United States Patent
Wada

(10) Patent No.: US 9,986,164 B2
(45) Date of Patent: May 29, 2018

(54) CAMERA SHAKING CORRECTION DEVICE AND IMAGING APPARATUS WITH OFFSET CORRECTION

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/273,799

(22) Filed: Sep. 23, 2016

(65) Prior Publication Data

US 2017/0013198 A1    Jan. 12, 2017

Related U.S. Application Data

(63) Continuation of application No. PCT/JP2014/079696, filed on Nov. 10, 2014.

(30) Foreign Application Priority Data

Mar. 25, 2014 (JP) .................. 2014-062194

(51) Int. Cl.
*H04N 5/228* (2006.01)
*H04N 5/232* (2006.01)
(Continued)

(52) U.S. Cl.
CPC .......... *H04N 5/23287* (2013.01); *G03B 5/00* (2013.01); *G06T 5/20* (2013.01); *H04N 5/23258* (2013.01);
(Continued)

(58) Field of Classification Search
CPC ................................ H04N 5/23287
(Continued)

(56) References Cited

U.S. PATENT DOCUMENTS

| 2010/0157080 A1* | 6/2010 | Kondo | G06T 1/00 348/222.1 |
| 2010/0208140 A1* | 8/2010 | Fukunishi | H04N 5/145 348/576 |
| 2014/0204228 A1* | 7/2014 | Yokokawa | H04N 5/23267 348/208.6 |

FOREIGN PATENT DOCUMENTS

| JP | 2005-151542 A | 6/2005 |
| JP | 2005151542 A * | 6/2005 |

(Continued)

OTHER PUBLICATIONS

International Search Report for PCT/JP2014/079696 dated Dec. 16, 2014.
(Continued)

*Primary Examiner* — Usman Khan
(74) *Attorney, Agent, or Firm* — Birch, Stewart, Kolasch & Birch, LLP

(57) ABSTRACT

A control section 11 moves an imaging lens 1 based on a detection signal from an angular velocity detection section 6 so as to correct image blurring which occurs in captured image data obtained through imaging performed by an imaging element 3. The control section 11 calculates a first motion vector between first captured image data, which is obtained through imaging performed by the imaging element 3, and second captured image data which is obtained subsequent to the first captured image data and in which image blurring is corrected. The control section 11 performs an offset correction for reducing an offset signal included in the detection signal of the angular velocity detection section 6, based on the first motion vector.

14 Claims, 13 Drawing Sheets

(51) Int. Cl.
    *G03B 5/00*         (2006.01)
    *G06T 5/20*         (2006.01)

(52) U.S. Cl.
    CPC ............... *G03B 2205/0007* (2013.01); *G03B 2217/005* (2013.01)

(58) Field of Classification Search
    USPC .................................................. 348/208.99
    See application file for complete search history.

(56) References Cited

FOREIGN PATENT DOCUMENTS

| | | |
|---|---|---|
| JP | 2007-221291 A | 8/2007 |
| JP | 2007-266771 A | 10/2007 |
| JP | 2009-211023 A | 9/2009 |
| JP | 2011-22354 A | 2/2011 |
| JP | 2012-163772 A | 8/2012 |

OTHER PUBLICATIONS

Written Opinion of the International Searching Authority for PCT/JP2014/079696 (PCT/ISA/237) dated Dec. 16, 2014.
English translation of the Written Opinion of the International Searching Authority for PCT/JP2014/079696 (PCT/ISA/237) dated Dec. 16, 2014.

* cited by examiner

CAMERA SHAKING CORRECTION DEVICE AND IMAGING APPARATUS WITH OFFSET CORRECTION

CROSS REFERENCE TO RELATED APPLICATION

This is a continuation of International Application No. PCT/JP2014/079696 filed on Nov. 10, 2014, and claims priority from Japanese Patent Application No. 2014-062194 filed on Mar. 25, 2014, the entire disclosures of which are incorporated herein by reference.

BACKGROUND OF THE INVENTION

1. Field of the Invention

The present invention relates to a camera shaking correction device and an imaging apparatus having the same.

2. Description of the Related Art

Some imaging apparatuses, which comprise an imaging element that captures an image of a subject through an optical imaging system, have a camera shaking correction function of correcting image blurring in the captured image caused by a motion of the imaging apparatus based on an angular velocity of the imaging apparatus detected by an angular velocity detection section such as a gyro sensor.

JP2007-266771A describes a camera shaking correction device that performs highly accurate camera shaking correction by correcting the amount of correction of image blurring based on an amount of correction of image blurring, which is obtained by performing amplification and AD conversion on an output of an angular velocity detection section, and a motion vector between two captured images which are temporally continuous.

JP2007-221291A describes an imaging apparatus that does not have an angular velocity detection section, and that performs camera shaking correction in the following manner: whether blurring is caused by camera shaking or blurring is caused by a parallel shift of an imaging apparatus is determined by calculating an amount of blurring and a blurring direction in an arbitrary captured image based on change in luminance between pixels within the captured image, and a range of cutting from the captured image is changed in a case where the blurring is caused by camera shaking.

SUMMARY OF THE INVENTION

An angular velocity detection section typified by a gyro sensor outputs a detection signal (offset signal) even in a state where an apparatus equipped with an angular velocity detection section is stationary. Consequently, if accurate camera shaking correction is intended to be performed, it is necessary to consider the offset signal.

The camera shaking correction device described in JP2007-266771A prevents error correction from being caused by a motion (for example parallel shift), which cannot be detected by an angular velocity detection section, by correcting an amount of correction of image blurring so as to make a motion vector between two captured images coincide with an amount of correction of image blurring which is calculated based on a sensor output. The camera shaking correction device corrects the amount of correction of image blurring based on the motion vector between two captured images obtained in a state where image blurring is not corrected. A motion of a camera during imaging is reflected in the motion vector, and the offset signal of the angular velocity detection section is not reflected therein. Hence, the camera shaking correction device described in JP2007-266771A cannot prevent error correction from being caused by the offset signal.

The imaging apparatus described in JP2007-221291A does not perform camera shaking correction using the angular velocity detection section, and thus there is no problem regarding error correction caused by the offset signal.

The present invention has been made in consideration of the above-mentioned situation, and has an object to provide a camera shaking correction device capable of performing a highly accurate correction even if an offset signal of an angular velocity detection section is present, and an imaging apparatus having the camera shaking correction device.

A camera shaking correction device of the present invention comprises: an angular velocity detection section that detects an angular velocity; an image blurring correction section that corrects image blurring, which occurs in captured image data obtained through imaging performed by an imaging element, by moving at least one of the imaging element, which captures an image of a subject through an optical imaging system, and the optical imaging system, based on a detection signal of the angular velocity detection section; a first motion vector calculation section that calculates a first motion vector between first captured image data, which is obtained through imaging performed by the imaging element, and second captured image data which is obtained subsequent to the first captured image data and in which image blurring is corrected by the image blurring correction section; and an offset correction section that performs offset correction for reducing an offset signal included in the detection signal of the angular velocity detection section, based on the first motion vector.

A camera shaking correction device of the present invention comprises: an angular velocity detection section that detects an angular velocity; an image blurring correction section that corrects image blurring, which occurs in captured image data obtained through imaging performed by an imaging element, by moving at least one of the imaging element, which captures an image of a subject through an optical imaging system, and the optical imaging system, based on a detection signal of the angular velocity detection section; an image blurring amount calculation section that calculates an amount of image blurring, which occurs in captured image data in which image blurring is corrected by the image blurring correction section, from the captured image data; and an offset correction section that performs offset correction for reducing an offset signal included in the detection signal of the angular velocity detection section, based on the amount of image blurring.

An imaging apparatus of the present invention comprises the camera shaking correction device.

According to the present invention, it is possible to provide a camera shaking correction device capable of performing highly accurate correction and an imaging apparatus having the same even if an offset signal of the angular velocity detection section is present.

BRIEF DESCRIPTION OF THE DRAWINGS

FIG. 6 is a diagram illustrating change in angular velocity detection signal ωx obtained when a motion with which image blurring cannot be corrected is caused by panning or the like.

DESCRIPTION OF THE PREFERRED EMBODIMENTS

Hereinafter, embodiments of the present invention will be described with reference to drawings.

Figure 1:
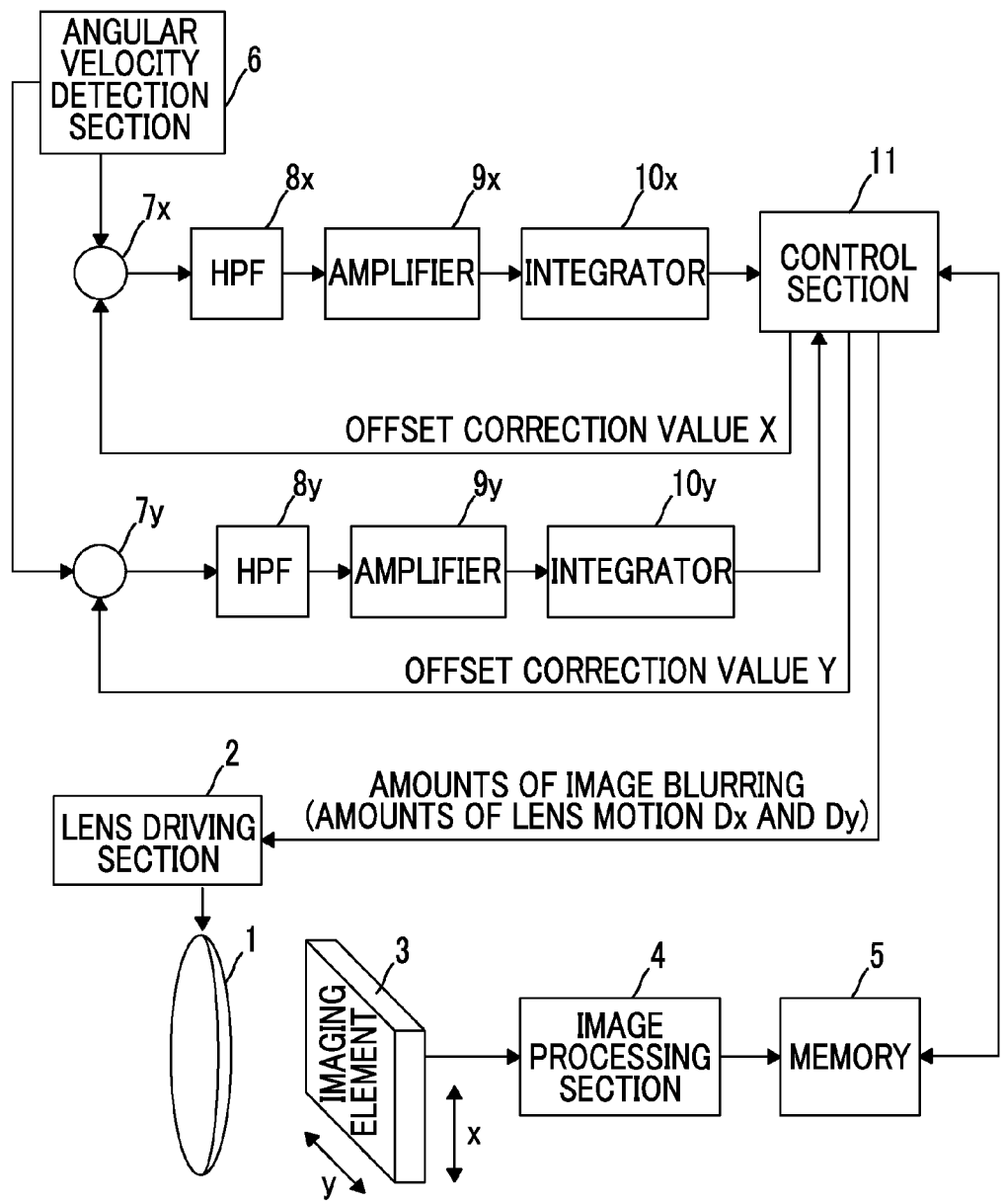
FIG. 1 is a diagram illustrating a schematic configuration of an imaging apparatus equipped with a camera shaking correction device according to an embodiment of the present invention.

FIG. 1 is a diagram illustrating a schematic configuration of an imaging apparatus equipped with a camera shaking correction device according to an embodiment of the present invention.

The imaging apparatus of FIG. 1 comprises: an imaging lens 1 as an optical imaging system; a lens driving section 2 that drives the imaging lens 1; an imaging element 3 that captures an image of a subject through the imaging lens 1; an image processing section 4 that generates captured image data by performing image processing on the captured image signal which is output from the imaging element 3; a memory 5 in which captured image data is primarily stored; an angular velocity detection section 6; addition/subtraction sections 7x and 7y; high-pass filters (HPF) 8x and 8y as filtering sections; amplifiers 9x and 9y; integrators 10x and 10y; and a control section 11. In such components, the imaging lens 1 and the lens driving section 2 may be units which can be detachably mounted on the imaging apparatus.

The imaging element 3 has an imaging surface on which pixels are arranged in a two-dimensional shape in an x direction and a y direction orthogonal thereto.

The imaging lens 1 is movable in the x direction and the y direction orthogonal thereto, and is driven by the lens driving section 2. The imaging lens 1 is an optical imaging system that includes a zoom lens for changing a focal length and has a variable focal length.

The angular velocity detection section 6, the addition/subtraction sections 7x and 7y, the HPFs 8x and 8y, the amplifiers 9x and 9y, the integrators 10x and 10y, and the control section 11 constitute the camera shaking correction device.

The angular velocity detection section 6 detects an angular velocity, and uses, for example, a gyro sensor. In the present description, the angular velocity detection section 6 is exemplified as a two-axis gyro sensor that detects angular velocities of rotation around axes which extend in directions (x direction and y direction) along two sides of the imaging surfaces of the imaging element 3 orthogonal to each other.

An angular velocity detection signal ωx of rotation around the x axis, which extends in the x direction, and an angular velocity detection signal ωy of rotation of the y axis, which extends in the y direction, are output from the angular velocity detection section 6.

Regarding the angular velocity detection signal ωx, in a state where the optical axis of the imaging lens 1 is vertical to the gravity direction, a sign of the signal, which is detected when the optical axis is oriented to the right side as viewed from a subject side, is positive, and a sign of the signal, which is detected when the optical axis is oriented to the left side, is negative.

Regarding the angular velocity detection signal ωy, in a state where the optical axis of the imaging lens 1 is vertical to the gravity direction, a sign of the signal, which is detected when the optical axis is oriented to the upper side as viewed from a subject side, is positive, and a sign of the signal, which is detected when the optical axis is oriented to the lower side, is negative.

The addition/subtraction section 7x adds or subtracts an offset correction value X to or from the angular velocity detection signal ωx which is output from the angular velocity detection section 6. The control section 11 sets whether to perform the addition or the subtraction. In the initial state immediately after the camera shaking correction device is activated, the offset correction value X=0.

The HPF 8x performs filtering for attenuating a low frequency component included in the angular velocity detection signal ωx which is output from the angular velocity detection section 6. The low frequency component includes not only noise but also the offset signal.

The HPF 8x performs filtering such that the low frequency component is finally equal to approximately zero but a certain time period from the signal input is necessary therefor until the low frequency component is zero. Hence, offset correction of the angular velocity detection section 6 is necessary until the time period has passed. Further, even if the HPF 8 is provided, the offset signal is not completely removable. Hence, the offset correction of the angular velocity detection section 6 is necessary.

The amplifier 9x multiplies a gain by the angular velocity detection signal ωx which is output from the HPF 8x, and amplifies the angular velocity detection signal ωx.

The integrator 10x integrates the angular velocity detection signal ωx, which is output from the amplifier 9x, with respect to the time, and calculates a swing angle θ1 which is an angle of rotation of the imaging apparatus around the x axis at this time.

The addition/subtraction section 7y adds or subtracts an offset correction value Y to or from the angular velocity detection signal ωy which is output from the angular velocity detection section 6. The control section 11 sets whether to perform the addition or the subtraction. In the initial state immediately after the camera shaking correction device is activated, the offset correction value Y=0.

The HPF 8y performs filtering for attenuating a low frequency component included in the angular velocity detection signal ωy which is output from the angular velocity detection section 6. The low frequency component includes not only noise but also the offset signal, but the offset correction is necessary in a manner similar to that of the angular velocity detection signal ωx.

The amplifier $9y$ multiplies a gain by the angular velocity detection signal ωy which is output from the HPF $8y$, and amplifies the angular velocity detection signal ωy.

The integrator $10y$ integrates the angular velocity detection signal ωy, which is output from the amplifier $9y$, with respect to the time, and calculates a swing angle θ2 which is an angle of rotation of the imaging apparatus around the y axis at this time.

The control section 11 calculates an amount of lens motion Dy, which is an amount of correction of image blurring for correcting image blurring in the y direction occurring in the captured image data obtained through imaging performed by the imaging element 3, based on the swing angle θ1.

Specifically, if the focal length of the imaging lens 1 is f, a value calculated by f×tan θ1 is an amount of shaking which is caused by actual motion of the imaging apparatus in the y direction. Hence, the amount of lens motion Dy, which is necessary for canceling the amount of shaking, is represented by Dy=−(f×tan θ1).

Further, the control section 11 calculates an amount of lens motion Dx, which is an amount of correction of image blurring for correcting image blurring in the x direction occurring in the captured image data obtained through imaging performed by the imaging element 3, based on the swing angle θ2.

Specifically, a value calculated by f×tan θ2 is an amount of shaking which is caused by actual motion of the imaging apparatus in the x direction. Hence, the amount of lens motion Dx, which is necessary for canceling the amount of shaking, is represented by Dx=−(f×tan θ2).

The control section 11 transmits the calculated amount of lens motion Dx and the calculated amount of lens motion Dy to the lens driving section 2, and causes the lens driving section 2 to move the imaging lens 1 by the amount of lens motion, thereby controlling correction of image blurring. The control section 11 functions as the image blurring correction section.

Further, the control section 11 calculates a first motion vector between the captured image data (first captured image data), which is stored in the memory 5 before image blurring correction, and the captured image data (second captured image data) which is obtained through imaging performed after the above captured image data after the image blurring. Then, the control section 11 performs offset correction for reducing the offset signal included in the detection signal of the angular velocity detection section 6, based on the first motion vector. The control section 11 functions as the first motion vector calculation section and the offset correction section.

Hereinafter, a description will be given of operations when the camera shaking correction function of the imaging apparatus of FIG. 1 is turned on.

Figure 2:
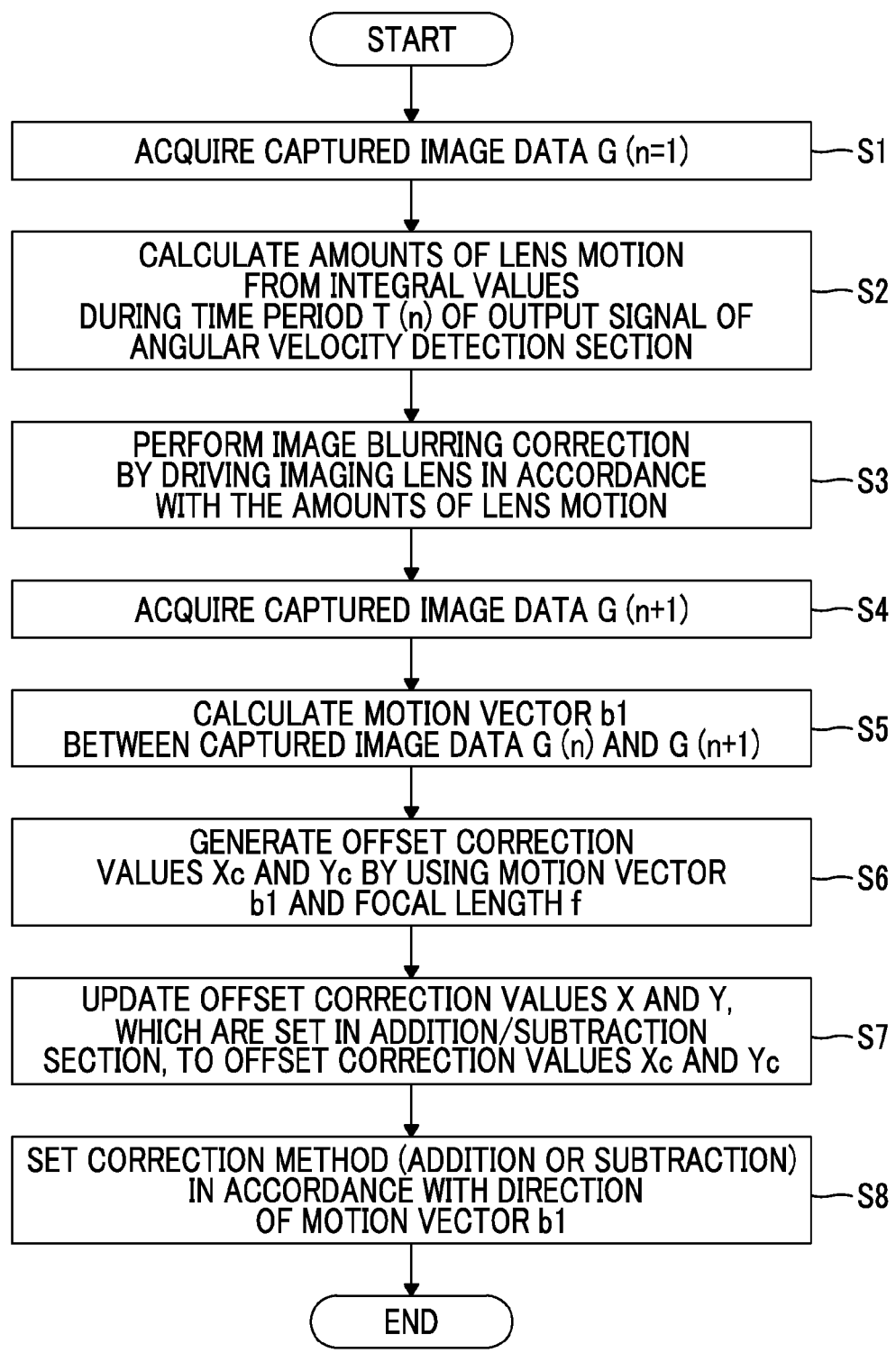
FIG. 2 is a flowchart illustrating operations of the imaging apparatus after the camera shaking correction device is activated.
Figure 3:
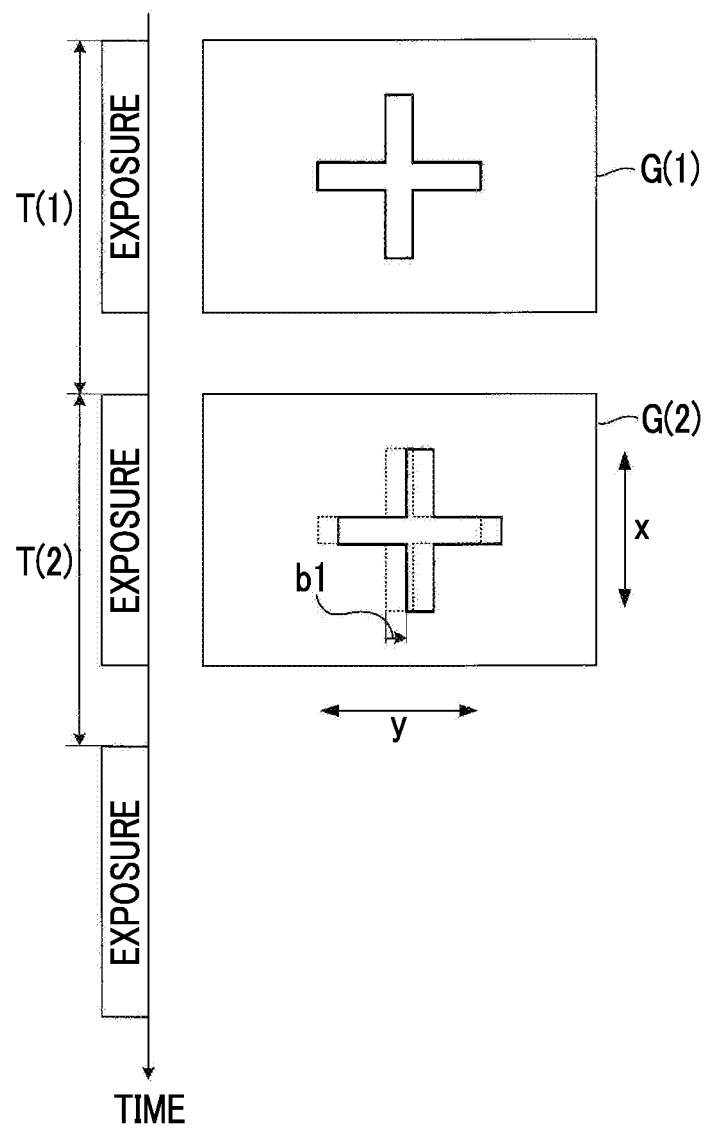
FIG. 3 is a diagram illustrating operations of FIG. 2.

In the imaging apparatus equipped with the camera shaking correction device, if the camera shaking correction function is turned on, the camera shaking correction device is activated. FIG. 2 is a flowchart illustrating operations of the imaging apparatus after the camera shaking correction device is activated. FIG. 3 is a diagram illustrating operations of FIG. 2.

If the camera shaking correction device is activated, the control section 11 acquires captured image data G (n) (n=1), which is obtained through imaging performed by the imaging element 3 immediately before or after the activation, from a memory 5 (step S1). The captured image data G (n) is data acquired in a state where the offset correction and the image blurring correction are not performed.

Next, as shown in FIG. 3, the control section 11 acquires integral values (swing angles θ1 and θ2) of the angular velocity detection signals ωx and ωy, from integrators $10x$ and $10y$, during a time period T (1) from start of exposure for obtaining the captured image data G (1) to start of exposure for obtaining the captured image data G (2).

The control section 11 calculates the amounts of lens motion Dx and Dy, which are necessary for canceling the image blurring of the captured image data caused by a motion of the imaging apparatus, based on the acquired swing angles θ1 and θ2 (step S2).

Next, the control section 11 performs the image blurring correction by driving the imaging lens 1 in accordance with the calculated amounts of lens motion Dx and Dy (step S3). During the time period in which the image blurring correction is being performed, exposure for obtaining captured image data G (n+1) is performed.

If the exposure is terminated and the captured image data G (n+1) is stored in the memory 5, the control section 11 acquires the captured image data G (n+1) from the memory 5 (step S4). The captured image data G (n+1) is captured image data which is not subjected to the offset correction and is subjected to the image blurring correction.

Then, the control section 11 performs pattern matching on the acquired captured image data G (n) and the acquired captured image data G (n+1), and calculates the first motion vector (a reference sign b1 of FIG. 3) between the captured image data G (n) and the captured image data G (n+1) (step S5).

When the captured image data not subjected to the offset correction and the image blurring correction was set as a reference, the first motion vector b1 indicates a motion in the captured image data which is obtained subsequent to the aforementioned captured image data and which is not subjected to the offset correction and is subjected to the image blurring correction. A motion, which is subjected to error correction based on the offset signal included in the detection signal of the angular velocity detection section 6, is reflected in the first motion vector b1.

The first motion vector b1 is divided into an x-direction motion vector bx1, which is a component in the x direction on the imaging surface, and a y-direction motion vector by1 which is a component in the y direction on the imaging surface.

Regarding the x-direction motion vector bx1, a direction from the bottom to the top in FIG. 3 is set to be positive, and a direction from the top to the bottom in FIG. 3 is set to be negative. Regarding the y-direction motion vector by1, a direction from the left to the right in FIG. 3 is set to be positive, and a direction from the right to the left in FIG. 3 is set to be negative.

The control section 11 generates an offset correction value Yc as the first correction value by using the x-direction motion vector bx1 and a focal length f of the imaging lens 1, and generates an offset correction value Xc as the first correction value by using the y-direction motion vector by1 and a focal length f of the imaging lens 1 (step S6). The control section 11 functions as the first correction value generation section.

Since the x-direction motion vector bx1 indicates a motion in the x direction between two images, it is necessary to convert the motion into the angular velocity detection signal ωy. Since the unit of the size of the x-direction motion vector bx1 is the number of pixels, and the number of pixels is converted into the swing angle θy of rotation of around the y axis. tan(θy)={(a size of bx1 (the number of pixels))*(a pixel pitch of the imaging element 3)}/f, and therefore a swing angle θy is calculated from the expression.

Next, the swing angle θy corresponds to an integral value during a time period T (2). Hence, a value, which is obtained by dividing the swing angle θy by the time period T (2), is divided again by a gain which is set by the amplifier 9y, and the result is equal to a size of the offset correction value Yc.

Likewise, since the unit of the size of the y-direction motion vector by1 is the number of pixels, and the number of pixels is converted into the swing angle θx of rotation around the x axis. tan(θx)={(a size of by1 (the number of pixels))*(a pixel pitch of the imaging element 3)}/f, and therefore a swing angle θx is calculated from the expression.

A value, which is obtained by dividing the swing angle θx by the time period T (2), is divided again by a gain which is set by the amplifier 9x, and the result is equal to a size of the offset correction value Xc.

Whether to add or subtract the offset correction value Xc and the offset correction value Yc to or from the detection signal of the angular velocity detection section 6 depends on the direction of the motion vector by1 or the motion vector bx1 which is a source of calculation of each of the offset correction value Xc and the offset correction value Yc.

If the y-direction motion vector by1 has a positive direction, a result of the image blurring correction shows that the imaging lens 1 moves in the −y direction, and thus it would appear that the offset signal of the angular velocity detection signal ωx is positive. Hence, in order to cancel the offset signal, it is necessary to subtract the offset correction value Xc from the detection signal. Further, if the y-direction motion vector by1 has a negative direction, it is necessary to add the offset correction value Xc to the detection signal.

Likewise, if the x-direction motion vector bx1 has a positive direction, a result of the image blurring correction shows that the imaging lens 1 moves in the −x direction, and thus it would appear that the offset signal of the angular velocity detection signal ωy is positive. Hence, in order to cancel the offset signal, it is necessary to subtract the offset correction value Yc from the detection signal. Further, if the x-direction motion vector bx1 has a negative direction, it is necessary to add the offset correction value Yc to the detection signal.

After step S6, the control section 11 updates the offset correction value X, which is set by the addition/subtraction section 7x, to Xc which is generated in step S6 from an initial value=0, and updates the offset correction value Y, which is set by the addition/subtraction section 7y, to Yc which is generated in step S6 from the initial value=0 (step S7).

Subsequently, the control section 11 sets a correction method, which is set by the addition/subtraction section 7x, to [subtraction] if the sign of the motion vector by1 of a generation source of the offset correction value Xc is positive, and sets the correction method to [addition] if the sign of the motion vector by1 is negative. Likewise, the control section 11 sets the correction method, which is set by the addition/subtraction section 7y, to [subtraction] if the sign of the motion vector bx1 of a generation source of the offset correction value Yc is positive, and sets the correction method to [addition] if the sign of the motion vector bx1 is negative (step S8).

Through such setting, the offset correction values Xc and Yc are added to or subtracted from the detection signal, which is output from the angular velocity detection section 6, and the offset signal is reduced, thereby performing the offset correction. Thereafter, the amount of correction of image blurring is calculated in a state where the offset correction is performed, and thus the image blurring correction is accurately performed.

As described above, the imaging apparatus of FIG. 1 performs the offset correction for reducing the offset signal of the angular velocity detection section 6, based on the first motion vector between the captured image data and captured image data which is obtained subsequent to the aforementioned captured image data and which is subjected to the image blurring correction. In such a manner, the detection signal of the angular velocity detection section 6 itself is corrected. Thus, after the offset correction values Xc and Yc and the correction method are set, the correction operations (the motion vector calculation, the offset correction value calculation, and the like) based on the offset signal are not necessary. As a result, it is possible to reduce an amount of calculation of the control section 11 as compared with the conventional art.

In the above description, the offset correction values Xc and Yc, which are set by the addition/subtraction sections 7x and 7y, are values which are calculated and generated by the size of the motion vector b1 and the focal length f.

A modification example thereof is as follows. The offset correction values X and Y may be changed by a certain amount at a time, and the offset correction values X and Y at a time point, at which the size of the motion vector b1 is less than a threshold value, are may be set as final offset correction values by the addition/subtraction sections 7x and 7y.

Figure 4:
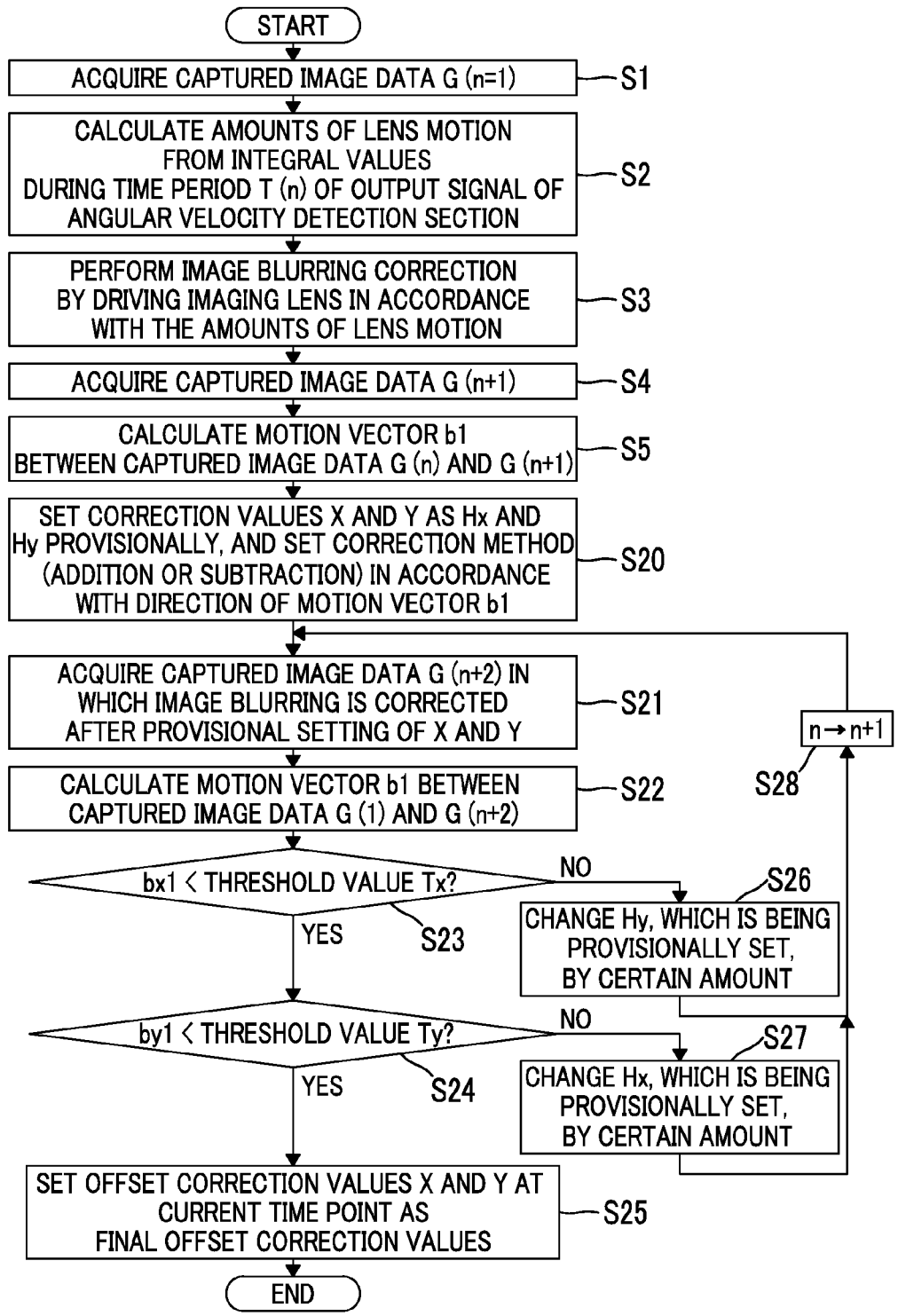
FIG. 4 is a flowchart illustrating a modification example of the operations of the imaging apparatus after the camera shaking correction device is activated.
Figure 5:
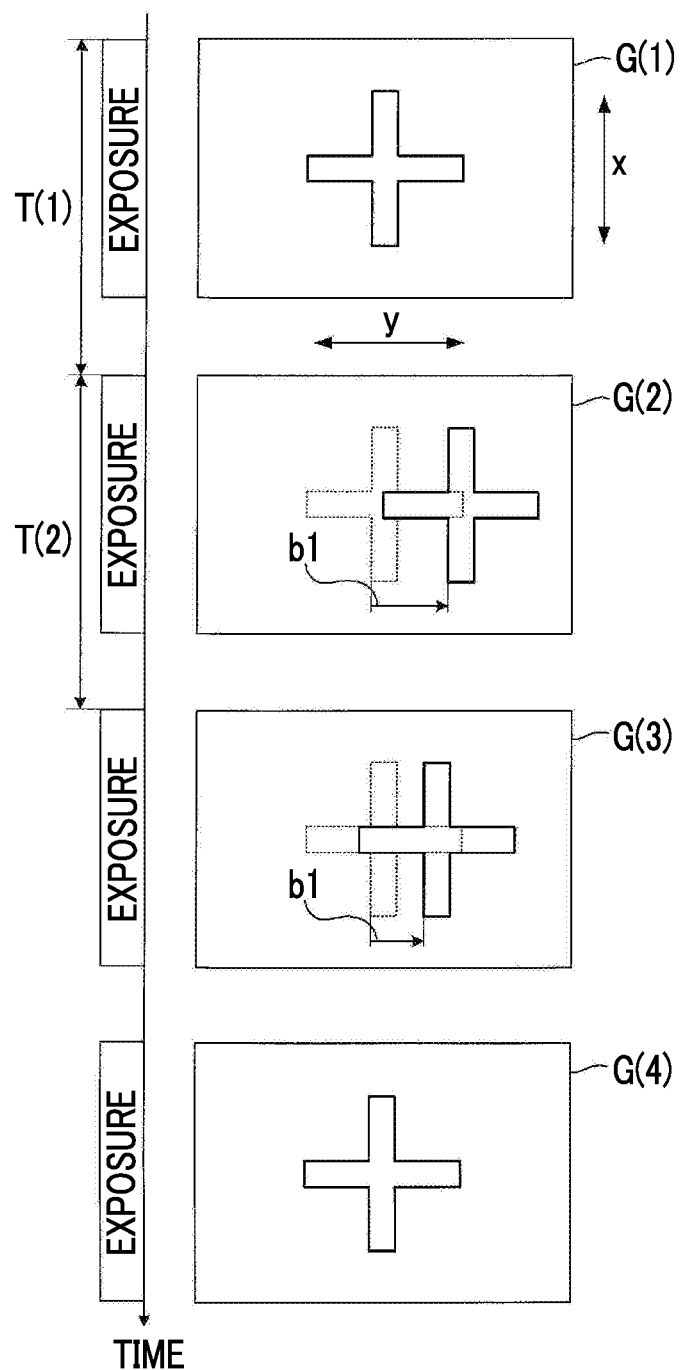
FIG. 5 is a diagram illustrating operations of FIG. 4.

FIG. 4 is a flowchart illustrating a modification example of the operations of the imaging apparatus after the camera shaking correction device is activated. FIG. 5 is a diagram illustrating operations of FIG. 4. In FIG. 4, processes, which are the same as those in FIG. 2, are represented by the same reference numerals and signs, and the description thereof will be omitted.

After step S5, the control section 11 provisionally sets a predetermined correction value Hx as the offset correction value X, sets a predetermined correction value Hy as the offset correction value Y, and sets [addition] or [subtraction] as a correction method in accordance with directions of the motion vectors bx1 and by1 (step S20).

Specifically, the control section 11 sets the [subtraction] for the addition/subtraction section 7x (7y) if the direction of the motion vector bx1 (by1) is positive, and sets the [addition] for the addition/subtraction section 7x (7y) if the direction of the motion vector bx1 (by1) is negative.

Next, the control section 11 acquires captured image data G (n+2) (third captured image data (captured image data G (3) of FIG. 5)), which is obtained by performing image blurring correction based on the detection signal to or from which correction values Hx and Hy are added or subtracted by the addition/subtraction sections 7x and 7y (step S21).

Next, the control section 11 calculates the motion vector b1 between the captured image data G (1), which is obtained before the setting of the correction values Hx and Hy, and the captured image data G (n+2) (step S22).

The control section 11 compares a threshold value Tx with a size of the motion vector bx1 which is an x-direction component of the motion vector b1 calculated in step S22 (step S23).

If the size of the motion vector bx1 is equal to or greater than the threshold value Tx (step S23: NO), the control section 11 changes Hy, which is being provisionally set as the offset correction value X, by a certain mount (step S26). For example, a value of Hy is changed to 1.5 times its original value.

After step S26, the control section 11 changes n to n+1 (step S28), and processing in step S21 is performed.

If the determination in step S23 is YES, the control section 11 compares a threshold value Ty with a size of the motion vector by1 which is a y-direction component of the motion vector b1 calculated in step S22 (step S24).

If the size of the motion vector by1 is equal to or greater than the threshold value Ty (step S24: NO), the control section 11 changes Hx, which is being provisionally set as the offset correction value Y, by a certain mount (step S27). For example, a value of Hx is changed to 1.5 times its original value.

After step S27, the control section 11 changes n to n+1 (step S28), and processing in step S21 is performed.

If the determination in step S24 is YES, the control section 11 sets the correction values Hx and Hy, which are provisionally set at this time point, as final offset correction values (step S25).

Through the above-mentioned operation, the size of the motion vector b1 between the captured image data, which is not subjected to the offset correction, and the captured image data, which is subjected to the correction of the detection signal based on the correction values Hx and Hy and is subjected to the image blurring correction, is converged, as shown in FIG. 5, to approximately zero when captured image data G (4) is obtained.

By setting the offset correction values Xc and Yc, which are provisionally set at the time point at which the captured image data G (4) is obtained, as final values, it is possible to reduce the offset signal. With such a configuration, calculation of the offset correction values is not necessary. As a result, it is possible to decrease power consumption by reducing the amount of calculation.

In the imaging apparatus of FIG. 1, the control section 11 performs the image blurring correction based on the angular velocity detection signal, and thus a small motion of the imaging apparatus has no effect on the captured image. However, like a case of panning or the like, in a case where the imaging apparatus greatly moves in the x direction or the y direction, image blurring cannot be corrected. Thus, in addition to the image blurring caused by the offset signal, image blurring caused by the panning remains between the captured image data, which is not subjected to the offset correction, and captured image data which is obtained subsequent to the aforementioned captured image data and which is not subjected to the offset correction and is subjected to the image blurring correction.

Figure 6:
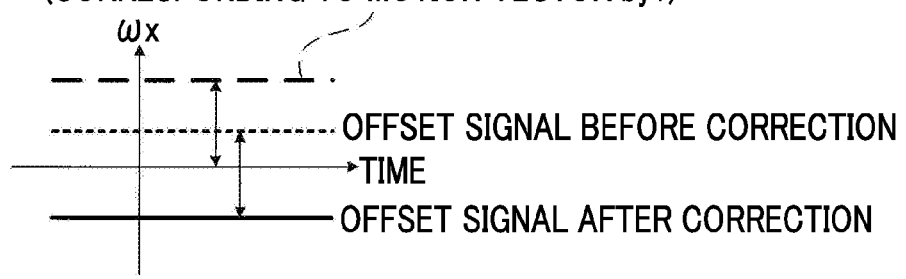

FIG. 6 is a diagram illustrating change in angular velocity detection signal ωx obtained when a motion with which image blurring cannot be corrected is caused by panning or the like.

As shown in FIG. 6, the offset signal, which is not subjected to the offset correction, is a positive value. However, if there is a motion which cannot be corrected through panning, the size of the motion vector b1 between the captured image data, which is not subjected to the offset correction, and captured image data, which is obtained subsequent to the aforementioned captured image data and which is not subjected to the offset correction and is subjected to the image blurring correction, is a value which is larger than that when there is no motion. Hence, the angular velocity detection signal ωx, which is obtained after the offset correction, is a negative value.

Then, as a result of the offset correction, in a state where there is no motion of the imaging apparatus at all, the angular velocity detection signal ωx becomes a negative value, and the offset signal remains.

Figure 7:
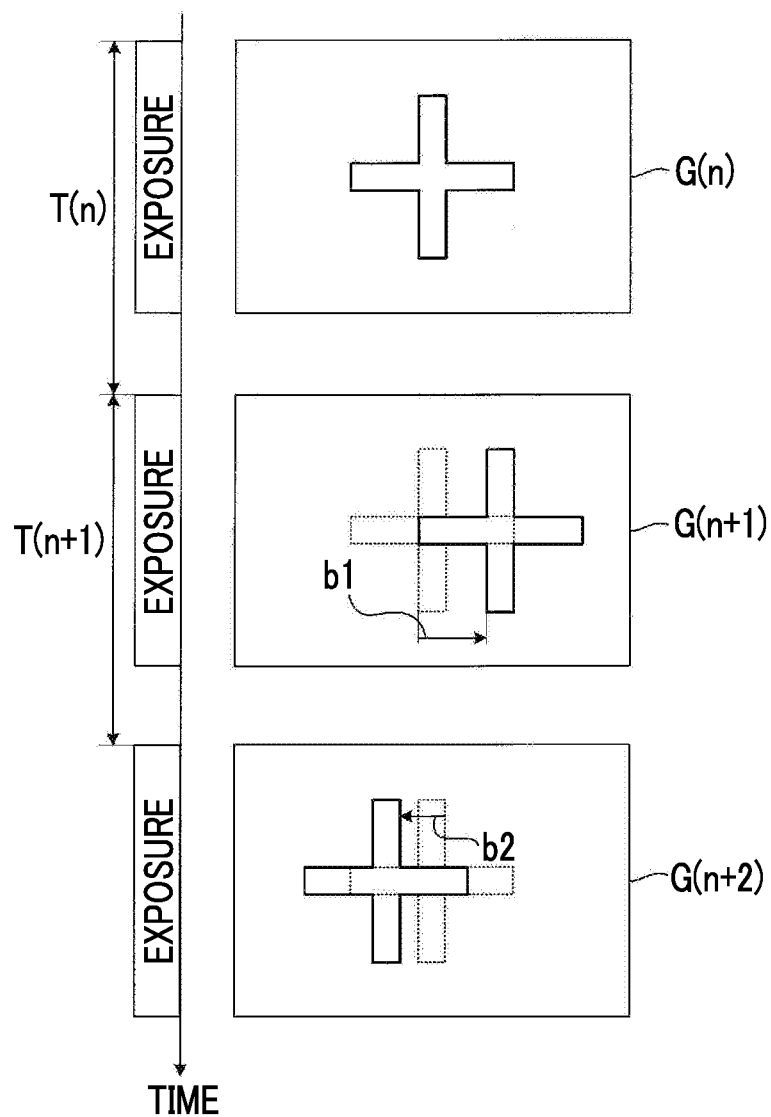
FIG. 7 is a diagram illustrating change in motion vector obtained when error correction is caused by panning.

As described above, if there is a difference in sign between the offset signal which is originally present and the offset signal which is caused by the result of the offset correction, as shown in FIG. 7, a direction of the first motion vector b1 between the captured image data G (n), which is not subjected to the offset correction, and the captured image data G (n+1), which is obtained subsequent to the captured image data G (n) and which is not subjected to the offset correction and is subjected to the image blurring correction, is opposite to a direction of the second motion vector b2 between the captured image data G (n) and the captured image data G (n+2) which is subjected to the offset correction and is subjected to the image blurring correction.

Hence, based on whether or not the directions of the motion vectors b1 and b2 are the same, it is possible to determine whether or not the motion which cannot be corrected through the image blurring correction processing such as panning occurs.

Figure 8:
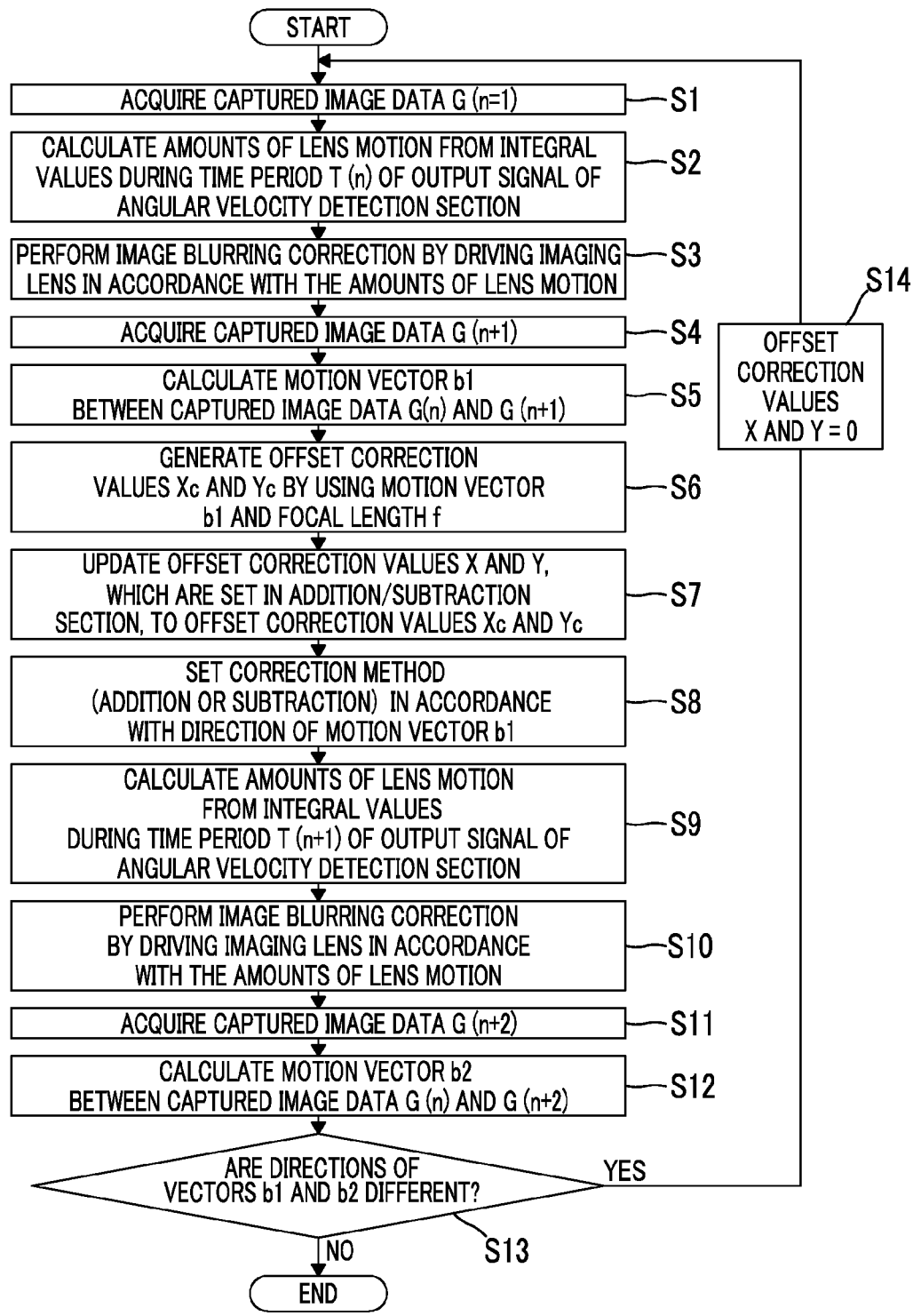
FIG. 8 is a flowchart illustrating a modification example of the operations of the imaging apparatus after the camera shaking correction device is activated.

FIG. 8 is a flowchart illustrating a modification example of the operations of the imaging apparatus after the camera shaking correction device is activated. In FIG. 8, processes, which are the same as those in FIG. 2, are represented by the same reference numerals and signs, and the description thereof will be omitted.

After step S8, the control section 11 acquires integral values of the angular velocity detection signals ωx and ωy in a time period T (n+1) from start of exposure for obtaining the captured image data G (n+1) to start of exposure for obtaining the captured image data G (n+2), from the integrators $10x$ and $10y$.

Then, the control section 11 calculates the amounts of lens motion Dx and Dy, which are necessary for canceling the image blurring of the captured image data caused by a motion of the imaging apparatus, based on the acquired integral values (step S9).

Next, the control section 11 performs the image blurring correction by driving the imaging lens 1 in accordance with the calculated amounts of lens motion Dx and Dy calculated in step S9 (step S10). During the time period in which the image blurring correction is being performed, exposure for obtaining captured image data G (n+2) is performed.

If the exposure is terminated and the captured image data G (n+2) is stored in the memory 5, the control section 11 acquires the captured image data G (n+2) from the memory 5 (step S11). The captured image data G (n+2) is captured image data which is subjected to the offset correction and is subjected to the image blurring correction.

The control section 11 performs pattern matching on the acquired captured image data G (n) and the acquired captured image data G (n+2), and calculates the second motion vector (a reference sign b2 of FIG. 7) between the captured image data G (n) and the captured image data G (n+2) (step S12). The control section 11 functions as the second motion vector calculation section.

The control section 11 determines whether the direction of the first motion vector b1 calculated in step S5 is different from the direction of the second motion vector b2 calculated in step S12 (step S13).

Here, the motion vectors b1 and b2 are divided into the x-direction components and the y-direction components, and whether directions of the vectors are different between the same direction components is determined. Subsequently, in a case where the directions of the vectors are different in either the x-direction component or the y-direction component, the determination in step S13 is YES, and in a case where the directions of the vectors are the same in both the x-direction component and the y-direction component, the determination in step S13 is NO.

In a case where the determination in step S13 is YES, it can be determined that the offset correction value generated in step S6 is not accurate. Hence, the control section 11 resets the offset correction values X and Y, which are set by the addition/subtraction sections 7x and 7y, to the initial value (=0) (step S14), and the processing returns to step S1.

In a case where the determination in step S13 is NO, it can be determined that the offset correction value generated in step S6 is accurate. Hence, the control section 11 keeps the offset correction values Xc and Yc, which are set by the addition/subtraction sections 7x and 7y, intact, and terminates the processing.

As described above, in a case where there is such a motion that image blurring cannot be corrected by panning or the like, by regenerating the offset correction values, it is possible to improve accuracy in offset correction.

Figure 9:
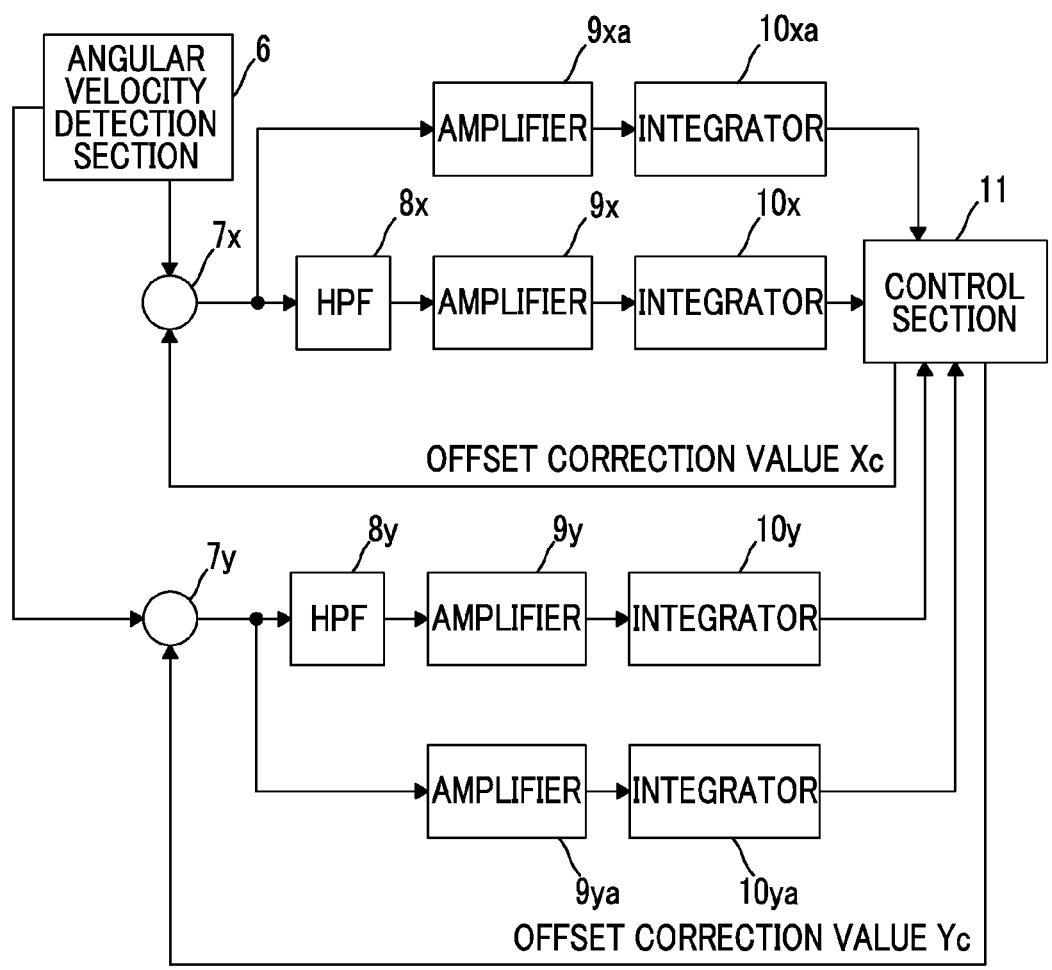
FIG. 9 is a diagram illustrating a modification example of parts of the camera shaking correction device in the imaging apparatus of FIG. 1.

FIG. 9 is a diagram illustrating a modification example of parts of the camera shaking correction device in the imaging apparatus of FIG. 1.

The camera shaking correction device shown in FIG. 9 has the same configuration as the camera shaking correction device of FIG. 1 except that an amplifier 9xa, an integrator 10xa, an amplifier 9ya, and an integrator 10ya are added.

The amplifier 9xa has the same function as the amplifier 9x, but is different from the amplifier 9x in that the amplifier 9xa directly amplifies an output signal of the addition/subtraction section 7x.

The integrator 10xa has the same function as the integrator 10x, integrates the output signal of the amplifier 9xa, and outputs the result to the control section 11.

The amplifier 9ya has the same function as the amplifier 9y, but is different from the amplifier 9y in that the amplifier 9ya directly amplifies an output signal of the addition/subtraction section 7y.

The integrator 10ya has the same function as the integrator 10y, integrates the output signal of the amplifier 9ya, and outputs the result to the control section 11.

When the control section 11 generates the offset correction value Xc, the camera shaking correction device shown in FIG. 9 uses not only the first motion vector and the focal length f, but also information about a difference between an amount of correction of image blurring, which is generated based on the detection signal not filtered by the HPF 8y, and an amount of correction of image blurring which is generated based on the detection signal filtered by the HPF 8y.

Further, when the control section 11 generates the offset correction value Yc, the camera shaking correction device shown in FIG. 9 uses not only the first motion vector and the focal length f, but also information about a difference between an amount of correction of image blurring, which is generated based on the detection signal not filtered by the HPF 8x, and an amount of correction of image blurring which is generated based on the detection signal filtered by the HPF 8x.

In the camera shaking correction device of FIG. 1, the control section 11 calculates the amounts of correction of image blurring based on the signals which are filtered through the HPF 8x and the HPF 8y. However, by using the HPF 8x and the HPF 8y, information about a part of each angular velocity detection signal is cut. Hence, the amounts of correction of image blurring, which are calculated based on the signals filtered through the HPF 8x and the HPF 8y, include errors relative to amounts of correction of image blurring which are calculated based on the signals obtained by directly amplifying the outputs of the addition/subtraction sections 7x and 7y without passing through the HPF 8x and the HPF 8y.

Accordingly, the control section 11 of FIG. 9 calculates a difference between the amount of correction of image blurring, which is calculated from the swing angle obtained through integration of the integrator 10x, and the amount of correction of image blurring which is calculated from the swing angle obtained through integration of the integrator 10xa. Then, the difference is converted into a value of the angular velocity detection signal ωx per unit time period, and the value is subtracted from the offset correction value Xc.

In such a manner, an error component of the image blurring correction caused by using the HPF 8x does not have to be corrected at the time of offset correction, and thus it is possible to perform the offset correction with high accuracy.

Likewise, the control section 11 of FIG. 9 calculates a difference between the amount of correction of image blurring, which is calculated from the swing angle obtained through integration of the integrator 10y, and the amount of correction of image blurring which is calculated from the swing angle obtained through integration of the integrator 10ya. Then, the difference is converted into a value of the angular velocity detection signal ωy per the unit time period, and the value is subtracted from the offset correction value Yc.

In such a manner, an error component of the image blurring correction caused by using the HPF 8y does not have to be corrected at the time of offset correction, and thus it is possible to perform the offset correction with high accuracy.

As an example of the method of the image blurring correction performed by the control section 11, a method of moving the imaging lens 1 in the x and y directions has been hitherto described. However, as the method of the image blurring correction, the following methods may be adopted: a method of moving the imaging element 3 in the x and y directions in a state where the imaging lens 1 is fixed; and a method of separately moving the imaging lens 1 and the imaging element 3.

Further, in the description hitherto given, the offset correction is performed only at the time of activation of the camera shaking correction device. However, after the activation thereof, the setting of the offset correction values may be periodically set again.

The offset signals of the angular velocity detection section 6 are changed by surrounding environment (such as a temperature). Hence, by detecting that the environment has changed and by performing the resetting of the offset correction values at this timing, it is possible to perform accurate offset correction. Further, the setting of the offset correction values may be manually started.

In the operation example of FIG. 2, the control section 11 acquires the offset correction values Xc and Yc through calculation. A modification example thereof is as follows. Relationships between the size of the first motion vector and the offset correction values Xc and Yc corresponding thereto may be calculated in advance, a table thereof may be created, and the offset correction values Xc and Yc may be set by reading the values from the table. Thereby, calculation is reduced, and thus it is possible to reduce power consumption.

As described above, even in a configuration where the offset correction is performed using the table of the first motion vector, the size of the first motion vector is stored in association with the information about the differences between the amounts of correction of image blurring, which are generated based on the detection signals not filtered by the HPFs 8x and 8y, and the amounts of correction of image blurring which are generated based on the detection signals filtered by the HPFs 8x and 8y.

In such a manner, error components of the image blurring correction caused by using the HPFs 8x and 8y do not have to be corrected at the time of offset correction, and thus it is possible to perform the offset correction with high accuracy.

The imaging lens 1 has a variable focal length, but the present invention can be applied to an imaging lens which has a fixed focal length.

In the description hitherto given, when the captured image data which is not subjected to the offset correction and is not subjected to the image blurring correction is set as a reference, the motion of the captured image data, which is obtained subsequent to the aforementioned captured image data and which is not subjected to the offset correction and is subjected to the image blurring correction, is calculated as the first motion vector.

However, when the captured image data which is not subjected to the offset correction and is subjected to the image blurring correction is set as a reference, the motion of the captured image data, which is obtained subsequent to the aforementioned captured image data and which is not subjected to the offset correction and is subjected to the image blurring correction, may be calculated as the first motion vector.

When the exposure time period of obtaining the captured image data is short, image blurring is less likely to occur in each captured image data. Hence, even if the first motion vector is calculated based on the captured image data which is not subjected to the image blurring correction, image blurring between the captured image data pieces based on the offset signals is reflected in the first motion vector.

In contrast, when the exposure time period of obtaining the captured image data is long, the imaging apparatus moves during the exposure time period, whereby image blurring is more likely to occur in the captured image data. The captured image data G (1) shown in FIG. 10 is obtained during a single exposure time period as shown in FIG. 11, where an image, on which a cross image slightly shifted in the y direction is superimposed, is captured.

Figure 10:
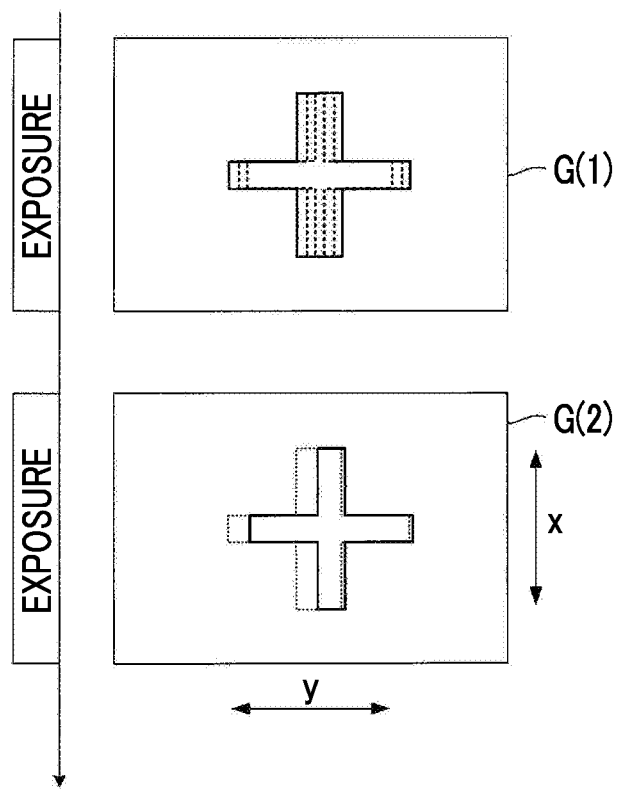
FIG. 10 is a diagram illustrating captured image data G (1) and G (2) obtained when an exposure time period is long.
Figure 11:
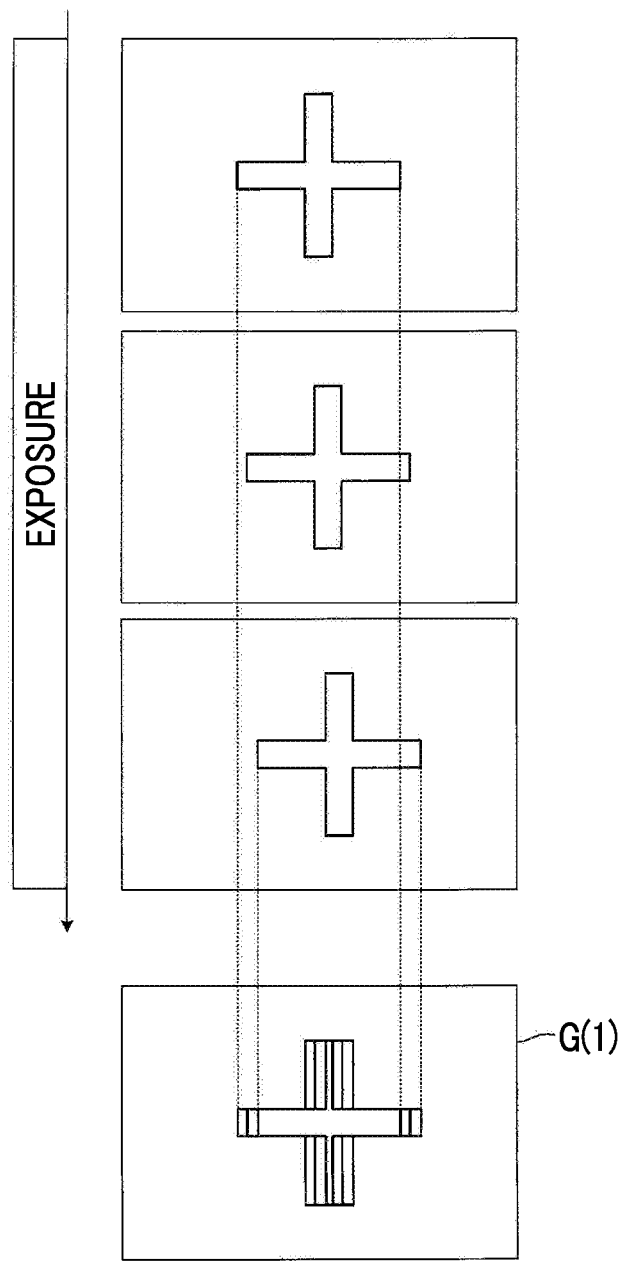
FIG. 11 is a diagram illustrating captured image data G (1) obtained when an exposure time period is long.

As described above, if there is image blurring in the captured image data G (1), subject images different between the captured image data G (1), which is not subjected to the image blurring correction, and the captured image data G (2), which is subjected to the image blurring correction shown in FIG. 10, are included in the data. Thus, it becomes difficult to perform pattern matching appropriately. As a result, the first motion vector is unlikely to be accurately calculated.

Accordingly, in a case where the exposure time period is long, by calculating the first motion vector based on the captured image data which is subjected to the image blurring correction, it is possible to increase accuracy in calculation of the first motion vector. As a result, it is possible to perform highly accurate offset correction.

Next, when the exposure time period is long, a modification example of operations of the imaging apparatus shown in FIG. 1 will be described.

Figure 12:
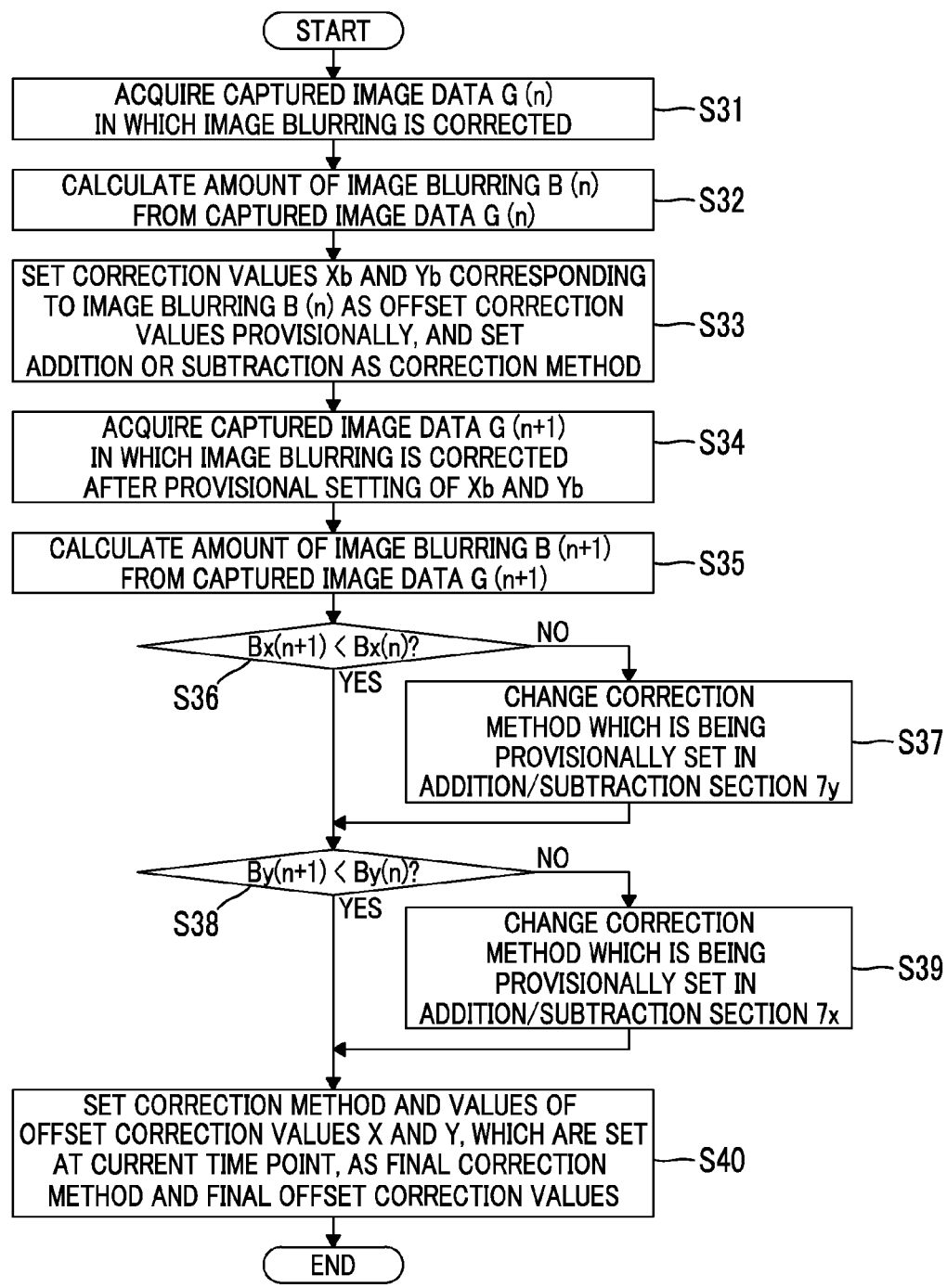
FIG. 12 is a flowchart illustrating a modification example of the operations of the imaging apparatus shown in FIG. 1.

FIG. 12 is a flowchart illustrating a modification example of the operations of the imaging apparatus shown in FIG. 1.

If the camera shaking correction device is activated, the control section 11 acquires captured image data G (n) (n=1), which is obtained through imaging performed by the imaging element 3 immediately before or after the activation and in which image blurring is corrected, from the memory 5 (step S31).

Next, the control section 11 calculates an amount of image blurring B (n) occurring in the captured image data G (n) (step S32). The control section 11 functions as the image blurring amount calculation section. The control section 11 calculates the amount of image blurring B (n) in accordance with, for example, a method described in JP2007-221291A.

That is, the control section 11 specifies a location, at which the edge of an image is spread by blurring, among one location or a plurality of locations in the captured image data G (n) by comparing differences in luminance between adjacent pixel data pieces, and calculates a width of spreading as the amount of image blurring (unit: the number of pixels).

The amount of image blurring B (n) is divided into the x-direction component and the y-direction, and performs calculation. The x-direction component of the amount of image blurring B (n) is referred to as an amount of image blurring Bx (n), and the y-direction component of the amount of image blurring B (n) is referred to as an amount of image blurring By (n).

Next, the control section 11 generates a correction value Yb as the second correction value corresponding to the amount of image blurring Bx (n), and generates a correction value Xb as the second correction value corresponding to the amount of image blurring By (n). Further, the control section 11 provisionally sets the correction value Xb as the offset correction value X which is set by the addition/subtraction section 7x, provisionally sets the correction value Yb as the offset correction value Y which is set by the addition/subtraction section 7y, and sets [addition] or [subtraction] as the correction method (step S33). The control section 11 functions as the second correction value generation section.

The control section 11 multiplies a value, which is obtained by differentiating the amount of image blurring Bx (n) with respect to the time, by a coefficient of correlation between a pixel pitch of the imaging element 3 and a sensitivity characteristic of the angular velocity detection section 6 (data that indicates which deg/sec in the y axis rotation an output of 1 mV corresponds to), thereby generating the correction value Yb.

By differentiating the amount of image blurring Bx (n) with respect to the time (By time-differentiating the amount of image blurring Bx (n)), it is possible to obtain a blurring speed (pixel/sec). In order to convert the blurring speed into the angular velocity detection signal (mV) of the y axis rotation, the blurring speed is multiplied by the coefficient of correlation. The coefficient of correlation is a coefficient that indicates which degrees in motion by an angle of the y axis rotation corresponds to a motion per one pixel. By multiplying the coefficient of correlation by the blurring speed which is obtained by differentiating the amount of image blurring Bx (n) with respect to the time, it is possible to obtain the correction value Yb (unit: mV).

Likewise, the control section 11 multiplies a value, which is obtained by differentiating the amount of image blurring By (n) with respect to the time, by a coefficient of correlation between a pixel pitch of the imaging element 3 and a sensitivity characteristic of the angular velocity detection section 6 (data that indicates which deg/sec in the x-axis rotation an output of 1 mV corresponds to), thereby generating the correction value Xb.

After step S33, the control section 11 acquires the captured image data G (n+1) which is obtained by performing the image blurring correction based on the detection signals to or from which the correction values Xb and Yb are added or subtracted by the addition/subtraction sections 7x and 7y (step S34).

Next, the control section 11 calculates an amount of image blurring B (n+1) occurring in the captured image data G (n+1) (step S35). The amount of image blurring B (n) corresponds to the first amount of image blurring, and the amount of image blurring B (n+1) corresponds to the second amount of image blurring.

Next, the control section 11 compares the amount of image blurring Bx (n) calculated in step S32 with the amount of image blurring Bx (n+1) calculated in step S35 (step S36).

In a case where the amount of image blurring Bx (n+1) is equal to or greater than the amount of image blurring Bx (n) (step S36: NO), the correction value Yb is added to or subtracted from the detection signal of the angular velocity detection section 6. As a result, the amount of image blurring in the x direction is not reduced, and it can be determined that the correction method provisionally set in step S33 is wrong. Thus, in step S37, the control section 11 changes the correction method, which is set by the addition/subtraction section 7y, to subtraction if the correction method is addition or to addition if the correction method is subtraction.

In a case where the amount of image blurring Bx (n+1) is less than the amount of image blurring Bx (n) (step S36: YES), the control section 11 compares the amount of image blurring By (n+1) with the amount of image blurring By (n) (step S38).

In a case where the amount of image blurring By (n+1) is equal to or greater than the amount of image blurring By (n) (step S38: NO), the correction value Xb is added to or subtracted from the detection signal of the angular velocity detection section 6. As a result, the amount of image blurring in the y direction is not reduced, and it can be determined that the correction method provisionally set in step S33 is wrong. Therefore, the control section 11 changes the correction method, which is set by the addition/subtraction section 7x, to subtraction if the correction method is addition or to addition if the correction method is subtraction (step S39).

In a case where the amount of image blurring By (n+1) is less than the amount of image blurring By (n) (step S38: YES), the control section 11 fixes the correction method, Xb, and Yb which are set at the current time point in the addition/subtraction sections 7x and 7y (step S40).

Through processing in step S40, the offset correction values Xb and Yb are added to or subtracted from the detection signal, which is output from the angular velocity detection section 6, and the offset signal is reduced, thereby performing the offset correction. Thereafter, the amount of correction of image blurring is calculated in a state where the offset correction is performed, and thus the image blurring correction is accurately performed.

As described above, according to the operation example of FIG. 12, even if the motion vector between the two captured images data pieces is not calculated, it is possible to perform the offset correction. Even in the operation example, the detection signal itself of the angular velocity detection section 6 is corrected. Thus, after the correction method and the offset correction values Xb and Yb are set, the correction operation based on the offset signal is not necessary. As compared with the conventional art, it is possible to reduce an amount of calculation of the control section 11.

Figure 13:
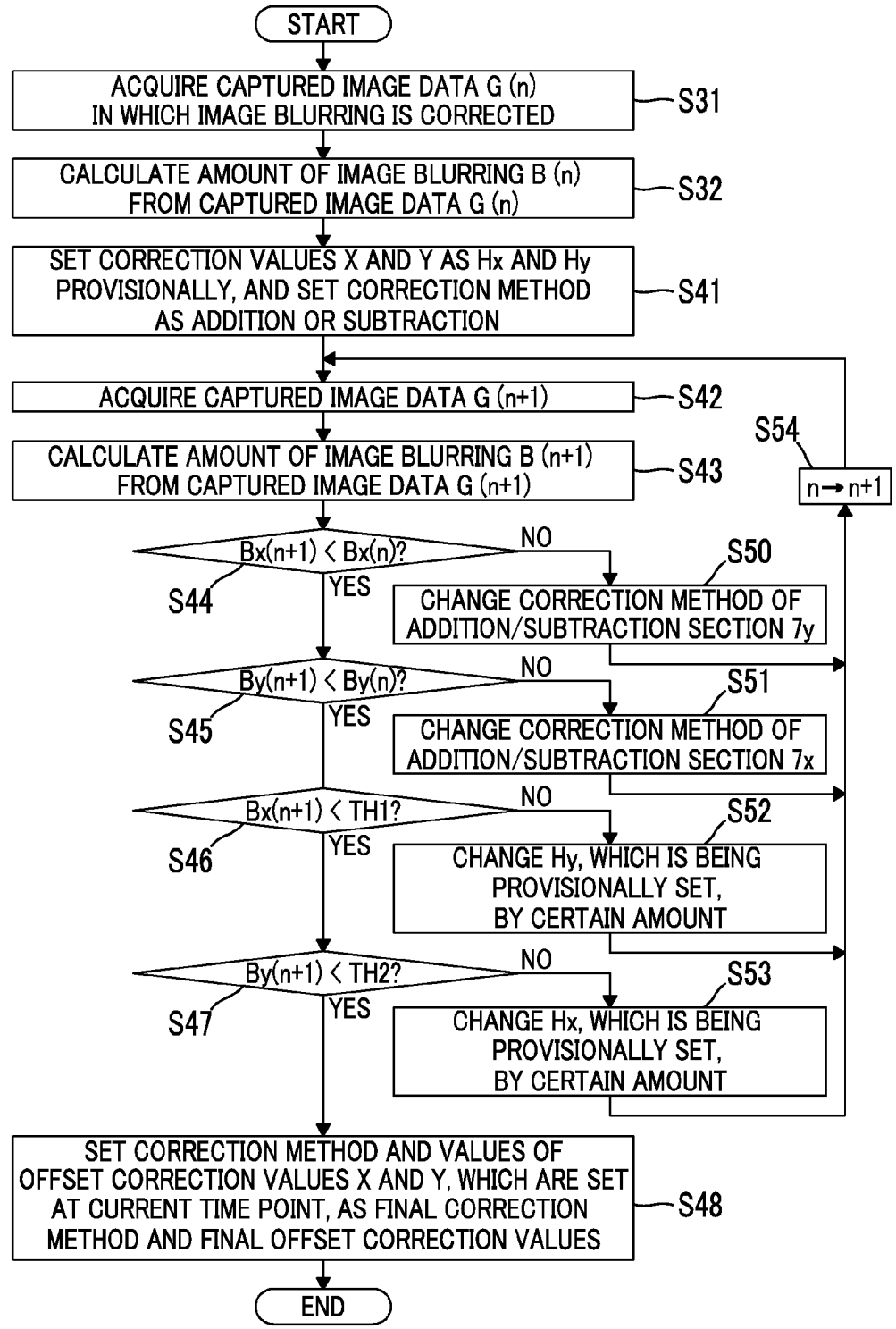
FIG. 13 is a flowchart illustrating another modification example of the operations of the imaging apparatus shown in FIG. 1.

FIG. 13 is a flowchart illustrating another modification example of the operations of the imaging apparatus shown in FIG. 1. In FIG. 13, processes, which are the same as those in FIG. 12, are represented by the same reference numerals and signs, and the description thereof will be omitted.

After step S32, the control section 11 provisionally sets the offset correction value X, which is set by the addition/subtraction section 7x, as a correction value Hx, and sets [addition] or [subtraction] as the correction method. Further, the control section 11 provisionally sets the offset correction value Y, which is set by the addition/subtraction section 7y, as a correction value Hy, and sets [addition] or [subtraction] as the correction method (step S41).

Next, the control section 11 acquires the captured image data G (n+1) which is obtained by performing the image blurring correction based on the detection signals to or from which the correction values Hx and Hy are added or subtracted by the addition/subtraction sections 7x and 7y (step S42).

Next, the control section 11 calculates an amount of image blurring B (n+1) occurring in the captured image data G (n+1) (step S43).

Next, the control section 11 compares the amount of image blurring Bx (n) calculated in step S32 with the amount of image blurring Bx (n+1) calculated in step S43 (step S44).

In a case where the amount of image blurring Bx (n+1) is equal to or greater than the amount of image blurring Bx (n) (step S44: NO), the control section 11 changes the correction method, which is being provisionally set in the addition/subtraction section 7y, to subtraction if the correction method is addition or to addition if the correction method is subtraction (step S50). After step S50, the control section 11 updates n to n+1 (step S54), and processing in step S42 is performed.

In a case where the amount of image blurring Bx (n+1) is less than amount of image blurring Bx (n) (step S44: YES), the control section 11 compares the amount of image blurring By (n), which is calculated in step S32, with the amount of image blurring By (n+1) which is calculated in step S43 (step S45).

In a case where the amount of image blurring By (n+1) is equal to or greater than the amount of image blurring By (n) (step S45: NO), the control section 11 changes the correction method, which is being provisionally set in the addition/subtraction section 7x, to subtraction if the correction method is addition or to addition if the correction method is subtraction (step S51). After step S51, the processing advances to step S54.

In a case where the amount of image blurring By (n+1) is less than the amount of image blurring By (n) (step S45: YES), the control section 11 determines whether or not the amount of image blurring Bx (n+1) is less than a threshold value TH1 (step S46).

When the determination of step S46 is NO, the control section 11 changes the offset correction value, which is set by the addition/subtraction section 7y, from Hx by a certain value (step S52). For example, a value of Hy is changed to 1.5 times its original value. After step S52, the processing advances to step S54.

When the determination of step S46 is YES, the control section 11 determines whether or not the amount of image blurring By (n+1) is less than a threshold value TH2 (step S47).

When the determination of step S47 is NO, the control section 11 changes the offset correction value, which is set by the addition/subtraction section 7x, from Hx by a certain value. For example, a value of Hx is changed to 1.5 times its original value. After step S53, the processing advances to step S54.

When the determination of step S47 is YES, the control section 11 sets the correction method and the offset correction values Hx and Hy, which are set at the current time point, as a final correction method and final offset correction values (step S48).

Through processing in step S48, the offset correction values Hx and Hy are added to or subtracted from the detection signal, which is output from the angular velocity detection section 6, and the offset signal is reduced, thereby performing the offset correction. Thereafter, the amount of correction of image blurring is calculated in a state where the offset correction is performed, and thus the image blurring correction is accurately performed.

As described above, the control section 11 changes the correction values Hx and Hy by a certain amount at a time until the amount of image blurring calculated from the captured image data in which image blurring is corrected based on the detection signal which is obtained after the correction values Hx and fly are added to or subtracted from the detection signal of the angular velocity detection section 6. Then, the control section 11 adds or subtracts the detection signal of the angular velocity detection section 6 to or from the correction values Hx and Hy in the state where the amount of image blurring is less than a threshold value, thereby performing offset correction.

Through the above-mentioned operation, the amount of image blurring, which occurs the captured image data subjected to the image blurring correction, is converged to approximately zero finally. By setting the correction method and the offset correction values X and Y, which are provisionally set at this time point, as final values, it is possible to reduce the offset signal. With such a configuration, calculation of the correction values corresponding to the amount of image blurring is not necessary. As a result, it is possible to decrease power consumption by reducing the amount of calculation.

As described above, the present description discloses the following items.

A disclosed camera shaking correction device comprises: an angular velocity detection section that detects an angular velocity; an image blurring correction section that corrects image blurring, which occurs in captured image data obtained through imaging performed by an imaging element, by moving at least one of the imaging element, which captures an image of a subject through an optical imaging system, and the optical imaging system, based on a detection signal of the angular velocity detection section; a first motion vector calculation section that calculates a first motion vector between first captured image data, which is obtained through imaging performed by the imaging element, and second captured image data which is obtained subsequent to the first captured image data and in which image blurring is corrected by the image blurring correction section; and an offset correction section that performs offset correction for reducing an offset signal included in the detection signal of the angular velocity detection section, based on the first motion vector.

In the disclosed camera shaking correction device, the offset correction section changes a correction value by a certain amount at a time until a size of the first motion vector, which is calculated by the first motion vector calculation section, between the first captured image data and a third captured image data is less than a threshold value, and reduces the offset signal by adding or subtracting the correction value, which is obtained when the size of the first motion vector is less than the threshold value, to or from the detection signal, where in the third captured image data, image blurring is corrected based on the detection signal to or from which the correction value has been added or subtracted in accordance with a direction of the first motion vector.

In the disclosed camera shaking correction device, the optical imaging system has a variable focal length, the camera shaking correction device further comprises a first correction value generation section that generates a correction value by using the size of the first motion vector and the focal length of the optical imaging system, and the offset correction section performs offset correction by adding or subtracting the correction value to or from the detection signal of the angular velocity detection section in accordance with a direction of the first motion vector.

The disclosed camera shaking correction device further comprises a filtering section that performs filtering for attenuating a low frequency component of the detection signal of the angular velocity detection section, in which the image blurring correction section corrects image blurring in accordance with an amount of correction of image blurring which is generated based on the filtered detection signal, and in which the first correction value generation section generates the correction value by further using a difference between an amount of correction of image blurring, which is generated based on the unfiltered detection signal, and the amount of correction of image blurring which is generated based on the filtered detection signal.

The disclosed camera shaking correction device further comprises a filtering section that performs filtering for attenuating a low frequency component of the detection signal of the angular velocity detection section, in which the image blurring correction section corrects image blurring in accordance with an amount of correction of image blurring which is generated based on the filtered detection signal, and in which the offset correction section performs the offset correction by further using a difference between an amount of correction of image blurring, which is generated based on the unfiltered detection signal, and the amount of correction of image blurring which is generated based on the filtered detection signal.

The disclosed camera shaking correction device further comprises a second motion vector calculation section that calculates a second motion vector between the first captured image data and captured image data in which image blurring is corrected based on the detection signal of the angular velocity detection section obtained after the offset signal is reduced by the offset correction section, in which in a case where the direction of the first motion vector is opposite to a direction of the second motion vector, the offset correction section performs the offset correction again, based on the first motion vector which is newly calculated.

In the disclosed camera shaking correction device, the offset correction section performs the offset correction at least at the time of activation of the camera shaking correction device.

A disclosed camera shaking correction device comprises: an angular velocity detection section that detects an angular velocity; an image blurring correction section that corrects image blurring, which occurs in captured image data obtained through imaging performed by an imaging element, by moving at least one of the imaging element, which captures an image of a subject through an optical imaging system, and the optical imaging system, based on a detection signal of the angular velocity detection section; an image blurring amount calculation section that calculates an amount of image blurring, which occurs in captured image data in which image blurring is corrected by the image blurring correction section, from the captured image data; and an offset correction section that performs offset correction for reducing an offset signal included in the detection signal of the angular velocity detection section, based on the amount of image blurring.

The disclosed camera shaking correction device further comprises a second correction value generation section that generates a correction value corresponding to the amount of image blurring, in which the offset correction section performs the offset correction by adding or subtracting the correction value to or from the detection signal of the angular velocity detection section.

In the disclosed camera shaking correction device, the offset correction section determines whether to add or subtract the correction value to or from the detection signal, in accordance with a magnitude relationship between a first amount of image blurring, which is calculated by the image blurring amount calculation section from captured image data in which image blurring is corrected based on the detection signal to or from which the correction value is not added or subtracted, and a second amount of image blurring, which is calculated by the image blurring amount calculation section from captured image data in which image blurring is corrected based on the detection signal to or from which the correction value has been added or subtracted.

In the disclosed camera shaking correction device, the second correction value generation section generates the correction value by multiplying a value, which is obtained by differentiating the amount of image blurring with respect to the time, by a coefficient of correlation between a pixel pitch of the imaging element and a sensitivity characteristic of the angular velocity detection section.

In the disclosed camera shaking correction device, the offset correction section changes a correction value by a certain amount at a time until an amount of image blurring is less than a threshold value, and performs offset correction by adding or subtracting the correction value, which is obtained in a state where the amount of image blurring is less than the threshold value, to or from the detection signal of the angular velocity detection section, where the amount of image blurring is calculated by the image blurring amount calculation section from captured image data in which image blurring is corrected based on the detection signal of the angular velocity detection section obtained after the correction value is added to or subtracted from the detection signal.

A disclosed camera shaking imaging apparatus comprises the camera shaking correction device.

The present invention is highly convenient and effective if it is applied to particularly electronics (referred to as imaging apparatuses) having an imaging function such as a digital camera and a camera-equipped smartphone.

The present invention has been hitherto described with reference to the specific embodiments. However, the present invention is not limited to the embodiments, and may be modified into various forms without departing from the technical scope of the present invention.

The present application is based on Japanese Patent Application (JP2014-062194A) filed on Mar. 25, 2014, the content of which is incorporated herein by reference.

EXPLANATION OF REFERENCES

1: imaging lens (optical imaging system)
3: imaging element
6: angular velocity detection section
7x, 7y: addition/subtraction section
8x, 8y: high-pass filter (filtering section)
11: control section (first motion vector calculation section, second motion vector calculation section, first correction value generation section, second correction value generation section, offset correction section, image blurring correction section, image blurring amount calculation section)

What is claimed is:

1. A camera shaking correction device comprising:
an angular velocity detection circuit that detects an angular velocity;
an image blurring correction circuit that corrects image blurring, which occurs in captured image data obtained through imaging performed by an imaging element, by moving at least one of the imaging element, which captures an image of a subject through an optical imaging system, and the optical imaging system, based on a detection signal of the angular velocity detection circuit;
a first motion vector calculation circuit that calculates a first motion vector between first captured image data, which is obtained through imaging performed by the imaging element, and second captured image data which is obtained subsequent to the first captured image data and in which image blurring is corrected by the image blurring correction circuit;
an offset correction circuit that performs offset correction for reducing an offset signal included in the detection signal of the angular velocity detection circuit, based on the first motion vector; and
a filtering circuit that performs filtering for attenuating a low frequency component of the detection signal of the angular velocity detection circuit,
wherein the image blurring correction circuit corrects image blurring in accordance with an amount of correction of image blurring which is generated based on the filtered detection signal, and
wherein the offset correction circuit performs the offset correction by further using a difference between an amount of correction of image blurring, which is generated based on the unfiltered detection signal, and the amount of correction of image blurring which is generated based on the filtered detection signal.

2. The camera shaking correction device according to claim 1,
wherein the optical imaging system has a variable focal length,
wherein the camera shaking correction device further comprises a first correction value generation circuit that generates a correction value by using the size of the first motion vector and the focal length of the optical imaging system, and
wherein the offset correction circuit performs offset correction by adding or subtracting the correction value to or from the detection signal of the angular velocity detection circuit in accordance with a direction of the first motion vector.

3. The camera shaking correction device according to claim 1,
further comprising a second motion vector calculation circuit that calculates a second motion vector between the first captured image data and captured image data in which image blurring is corrected based on the detection signal of the angular velocity detection circuit obtained after the offset signal is reduced by the offset correction circuit,
wherein in a case where the direction of the first motion vector is opposite to a direction of the second motion vector, the offset correction circuit performs the offset correction again, based on the first motion vector which is newly calculated.

4. The camera shaking correction device according to claim 2,
further comprising a second motion vector calculation circuit that calculates a second motion vector between the first captured image data and captured image data in which image blurring is corrected based on the detection signal of the angular velocity detection circuit obtained after the offset signal is reduced by the offset correction circuit,
wherein in a case where the direction of the first motion vector is opposite to a direction of the second motion vector, the offset correction circuit performs the offset correction again, based on the first motion vector which is newly calculated.

5. The camera shaking correction device according to claim 1,
wherein the offset correction circuit performs the offset correction at least at a time of activation of the camera shaking correction device.

6. The camera shaking correction device according to claim 2,
wherein the offset correction circuit performs the offset correction at least at a time of activation of the camera shaking correction device.

7. The camera shaking correction device according to claim 3,
wherein the offset correction circuit performs the offset correction at least at a time of activation of the camera shaking correction device.

8. The camera shaking correction device according to claim 4,
wherein the offset correction circuit performs the offset correction at least at a time of activation of the camera shaking correction device.

9. An imaging apparatus comprising the camera shaking correction device according to claim 1.

10. A camera shaking correction device comprising:
an angular velocity detection circuit that detects an angular velocity;
an image blurring correction circuit that corrects image blurring, which occurs in captured image data obtained through imaging performed by an imaging element, by moving at least one of the imaging element, which captures an image of a subject through an optical imaging system, and the optical imaging system, based on a detection signal of the angular velocity detection circuit;
an image blurring amount calculation circuit that calculates an amount of image blurring, which occurs in captured image data in which image blurring is corrected by the image blurring correction circuit, by comparing differences in luminance between adjacent pixel data pieces in the captured image data;
and an offset correction circuit that performs offset correction for reducing an offset signal included in the detection signal of the angular velocity detection circuit, based on the amount of image blurring;
wherein the offset correction circuit determines whether to add or subtract the correction value to or from the detection signal, in accordance with a magnitude relationship between a first amount of image blurring, which is calculated by the image blurring amount calculation circuit from captured image data in which image blurring is corrected based on the detection signal to or from which the correction value is not added or subtracted, and a second amount of image blurring, which is calculated by the image blurring amount calculation circuit from captured image data in which image blurring is corrected based on the detection signal to or from which the correction value has been added or subtracted.

11. The camera shaking correction device according to claim 10,
further comprising a second correction value generation circuit that generates a correction value corresponding to the amount of image blurring,
wherein the offset correction circuit performs the offset correction by adding or subtracting the correction value to or from the detection signal of the angular velocity detection circuit.

12. The camera shaking correction device according to claim 11,
wherein the second correction value generation circuit generates the correction value by multiplying a value, which is obtained by differentiating the amount of image blurring with respect to time, by a coefficient of correlation between a pixel pitch of the imaging element and a sensitivity characteristic of the angular velocity detection circuit.

13. The camera shaking correction device according to claim 10, wherein the second correction value generation circuit generates the correction value by multiplying a value, which is obtained by differentiating the amount of image blurring with respect to time, by a coefficient of correlation between a pixel pitch of the imaging element and a sensitivity characteristic of the angular velocity detection circuit.

14. The camera shaking correction device according to claim 10, wherein the offset correction circuit changes a correction value by a certain amount at a time until an amount of image blurring is less than a threshold value, and performs offset correction by adding or subtracting the correction value, which is obtained in a state where the amount of image blurring is less than the threshold value, to or from the detection signal of the angular velocity detection circuit, where the amount of image blurring is calculated by the image blurring amount calculation circuit from captured image data in which image blurring is corrected based on the detection signal of the angular velocity detection circuit obtained after the correction value is added to or subtracted from the detection signal.

* * * * *